(12) United States Patent
Maas

(10) Patent No.: US 7,349,591 B2
(45) Date of Patent: Mar. 25, 2008

(54) PRESSURE COMPENSATED OPTICAL ACCELEROMETER, OPTICAL INCLINOMETER AND SEISMIC SENSOR SYSTEM

(75) Inventor: Steven J. Maas, Pflugerville, TX (US)

(73) Assignee: PGS Geophysical AS, Lysaker (NO)

( * ) Notice: Subject to any disclaimer, the term of this patent is extended or adjusted under 35 U.S.C. 154(b) by 0 days.

(21) Appl. No.: 11/355,281

(22) Filed: Feb. 15, 2006

(65) Prior Publication Data

US 2007/0189658 A1    Aug. 16, 2007

(51) Int. Cl.
*G02B 6/00* (2006.01)

(52) U.S. Cl. .......................... 385/13; 385/12; 385/134; 385/135; 250/227.14; 250/227.18; 250/227.23; 250/231.1

(58) Field of Classification Search ................ 73/516; 250/227.23, 227.18, 227.14, 231.1; 385/134–135, 385/12–13
See application file for complete search history.

(56) References Cited

U.S. PATENT DOCUMENTS

| | | | |
|---|---|---|---|
| 3,897,690 A * | 8/1975 | Hanson ................. 73/514.19 |
| 4,829,821 A * | 5/1989 | Carome ................. 73/514.09 |
| 5,369,485 A | 11/1994 | Hofler et al. |
| 5,506,682 A * | 4/1996 | Pryor ..................... 356/623 |
| 5,625,724 A | 4/1997 | Frederick et al. |
| 6,314,371 B1 | 11/2001 | Monk |
| 6,439,055 B1 * | 8/2002 | Maron et al. ................. 73/705 |
| 6,549,488 B2 | 4/2003 | Maas et al. |
| 6,575,033 B1 | 6/2003 | Knudsen et al. |
| 6,650,418 B2 | 11/2003 | Tweedy et al. |
| 6,671,055 B1 * | 12/2003 | Wavering et al. ........... 356/478 |
| 6,955,085 B2 * | 10/2005 | Jones et al. ............. 73/514.26 |
| 2004/0202401 A1 * | 10/2004 | Berg et al. ..................... 385/12 |

FOREIGN PATENT DOCUMENTS

GB    2 110 501    6/1983

OTHER PUBLICATIONS

S.T. Vohra, B. Danver, A. Tveten, A. Dandridge, "Fiber Optic Interferometric Accelerometers", American Institute of Physics, 1996, pp. 285-293.

* cited by examiner

*Primary Examiner*—Brian Healy
*Assistant Examiner*—Guy G Anderson
(74) *Attorney, Agent, or Firm*—E. Eugene Thigpen; Richard A. Fagin

(57) ABSTRACT

An optical accelerometer includes means for changing the length of at least one optical fiber in response to acceleration functionally coupled to the at least one optical fiber. The fiber and the means for changing length are enclosed in a pressure compensated housing. The housing is filled with a substantially incompressible fluid or gel.

35 Claims, 6 Drawing Sheets

PRESSURE COMPENSATED OPTICAL ACCELEROMETER, OPTICAL INCLINOMETER AND SEISMIC SENSOR SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of optical acceleration and inclination sensing devices. More particularly, the invention relates to optical accelerometers and inclinometers used for, but not limited to, sensing seismic energy.

2. Background Art

Optical sensing devices for measuring parameters such as acceleration, motion and/or pressure are used for, among other purposes, detecting seismic energy from the Earth's subsurface. The seismic energy may be naturally occurring, or may be imparted into the Earth by a seismic energy source for the purpose of performing reflection seismic surveys. Detecting seismic energy may include measuring pressure, or changes in pressure with respect to time, in a body of water. A sensor used to measure such changes in pressure is known as a hydrophone. Detecting seismic energy also includes detecting motion on or near the Earth's surface. Motion may be detected using devices known as geophones or accelerometers. Geophone signals are related to velocity of motion. Accelerometers produce signals related to the time derivative of velocity of motion, which is acceleration. Inclinometers, which produce signals related to the relative orientation of a device with respect to the direction of Earth's gravitational pull, are sometimes used in association with other sensors to determine the gravitational orientation of any device associated with the inclinometer.

Sensors known in the art which respond to the foregoing physical parameters generate an optical signal in response to the detected physical parameter. The optical signal may be, for example, a change in reflected wavelength, a change in phase or an interference pattern in response to changes in the physical parameter.

Generally, optical sensors known in the art include a selected length of optical fiber affixed to a device that changes shape in response to changes in the physical parameter being detected. The change in shape of the device is transformed into a change in length of the optical fiber. Change in length of the optical fiber may be detected by one of a number of different optical measurement techniques. Such techniques include change in reflected wavelength of light as a result of a change in wavelength of a Bragg grating formed in the optical fiber, or optical coupling of a light beam transmitted through the optical fiber with a light beam transmitted through another optical fiber, known as a "reference fiber." The reference fiber may be disposed such that its length remains essentially unchanged irrespective of the value of the physical parameter. Light beams from the fiber affixed to the device and from the reference fiber are coupled in an optical interferometer. An interference pattern or phase change in the light generated in the optical interferometer is related to the change in length of the fiber coupled to the device, and thus to the physical parameter being measured. Typically the output of the interferometer is coupled to a photodetector, which generates an electrical signal related to the light amplitude applied to the photodetector.

A fiber optic hydrophone is disclosed, for example, in U.S. Pat. No. 5,625,724 issued to Frederick et al. The hydrophone disclosed in the Frederick et al. '724 patent includes a reference fiber wrapped around a rigid inner cylinder. A solid layer of compliant material is applied over the reference fiber. The sensing arm of the interferometer is wound over the layer of material applied over the reference fiber. The outer material is sufficiently compliant to provide acoustic sensitivity comparable to that of air-backed hydrophones.

Another fiber optic hydrophone is disclosed in U.S. Pat. No. 6,549,488 issued to Maas et al. and assigned to the assignee of the present invention. A hydrophone made according to the Maas et al. '488 patent includes a compliant sensing mandrel coaxial with and adjacent to a rigid reference mandrel. A first optical fiber is wound around the compliant sensing mandrel. A second optical fiber is wound around the reference mandrel. The first and second optical fibers comprise different arms of an interferometer. Flexible sealing members, such as O-rings, seal the compliant sensing mandrel to the rigid reference mandrel. In one embodiment, one O-ring is disposed near each end of the sensing mandrel. A cylindrical support member is disposed inside the sensing mandrel. At least a portion of the support member is spaced from the sensing mandrel so as to provide a sealed cavity between the sensing mandrel and the support member. The sealed cavity is filled with air or similar compliant substance.

U.S. Pat. No. 5,369,485 issued to Hofler et al. discloses an optical accelerometer wherein an elastic disk and a predetermined mass are supported by a body for flexure of the disk due to acceleration, shock, vibration and displacement of the body in a direction axially of the disk. Such a disk, or a plurality of such disks, are wound with a pair of flat spirals of optical fiber, each spiral being fixedly attached to a corresponding disk side so that disk flexure lengthens a spiral on one disk side and shortens a spiral on another disk side. Such spirals on oppositely facing disk sides are connected as opposite legs of a fiber optical interferometer so that the interferometer provides an output corresponding to the amplitude of the flexure. A "push-pull" pair of the spirals may be disposed oppositely of a thermally conducting disk to minimize temperature differences between the push-pull spiral pair. An accelerometer according to the disclosure in the Hofler et al. patent is constructed with a centrally supported disk having the mass distributed around the disk periphery. Such construction is purported to be advantageous for isolation from mounting stress and for providing a plurality of coaxially mounted disks for increased sensitivity.

U.S. Pat. No. 6,650,418 issued to Tweedy et al. discloses a fiber optic sensor that includes a flexural disk having a pair of fiber optic coils mounted on opposite sides thereof and optically coupled together to form an interferometer that produces an output signal in response to acceleration of the flexural disk. The accelerometer includes a housing having first and second end plates with a sidewall extending between the end plates. The sidewall has an inwardly facing groove in which an outer edge portion of the flexural disk is mounted. A compressive damper is mounted in the housing and arranged to exert a compressive force on the flexural disk to control movement thereof in response to acceleration of the flexural disk along a sensing axis and thereby control the output signal.

U.S. Pat. No. 6,575,033 issued to Knudsen et al. discloses a highly sensitive accelerometer, which includes a mass within a housing suspended by opposing support members. The support members are alternately wound around a pair of fixed mandrels and the mass in a push-pull arrangement. At least a portion of one of the support members comprises optical fiber coils as the support members for use in interferometric sensing processes.

More recently, multiple-direction sensitive ("multicomponent") motion sensors disposed on a cable in conjunction with substantially collocated hydrophones have been used on the bottom of a body of water for marine seismic surveying. Such cables are known in the art as "dual sensor OBCs." See, for example, U.S. Pat. No. 6,314,371 issued to Monk, which discloses a method for processing of dual sensor OBC data that corrects for energy incidence angle, corrects for estimated reflectivity, and combines corrected seismic sensor traces using an optimal diversity scaling technique. In one embodiment, the disclosed method takes seismic traces from a geophone and a hydrophone, corrects the geophone trace for the incidence angle, determines diversity filters for optimally combining the geophone and hydrophone traces, applies the diversity filters, estimates a reflectivity coefficient for the ocean bottom (potentially for different angles of reflection), scales the geophone data according to the reflectivity, and re-applies the diversity filters to obtain a combined trace. The combined trace is expected to have various artifacts eliminated, including ghosting and reverberation, and is expected to have an optimally determined signal-to-noise ratio.

It is important that motion sensors in general, and in particular those sensors used in dual sensor OBCs, have good sensitivity, are relatively insensitive to noise, and have good rejection of cross-component signal (meaning that the motion sensors are substantially insensitive to motion along any direction other than the sensitive axis). Accordingly, there is a continuing need for motion and/or acceleration sensors that have improved sensitivity, reduced noise and reduced cross-component sensitivity. More recently, an improved optical acceleration sensor particularly suited for use with OBCs has been devised by Steven J. Maas and D. Richard Metzbower, as more fully described in U.S. patent application Ser. No. 11/095,860—filed on Mar. 31, 2005 and assigned to the assignee of the present invention. Such improved optical acceleration sensor includes a beam and at least one optical fiber affixed to one side of the beam such that deflection of the beam changes a length of the optical fiber. Means for sensing the change in length of the optical fiber is functionally coupled to the at least one fiber.

One common limitation to substantially all motion and acceleration sensors known in the art for use with OBCs and other submerged sensing systems is that they are typically disposed in a pressure resistant housing. The pressure resistant housing is adapted to exclude water under high pressure, such as caused by submersion of the sensor at great water depth (approximately 3000 meters or more) from entering the housing. An interior of such housings is generally maintained at surface atmospheric pressure (about 1 bar). As a practical matter, housings having the capability of excluding water under pressure such as at the foregoing submersion depths must be made from steel or similar high strength material, and must have relatively thick walled construction to avoid crushing under pressure or leakage. Such construction is expensive, and makes any sensor system such as an OBC used therewith heavy and difficult to deploy. Accordingly, there exists a need for improved optical motion sensing devices that can be immersed to great water depth, while avoiding the expense and difficulty of construction of pressure resistant housings for the sensors.

SUMMARY OF THE INVENTION

One aspect of the invention is an optical accelerometer. An accelerometer according to this aspect of the invention includes a means for changing a length of at least one optical fiber in response to acceleration. Means for sensing the change in length of the optical fiber is functionally coupled to the at least one optical fiber. The means for changing length and the at least one optical fiber are enclosed in a pressure compensated housing. The housing is filled with a substantially incompressible fluid or gel. In one embodiment, the means for changing comprises a beam. The at least one optical fiber is affixed to one side of the beam such that deflection of the beam changes the length of the at least one optical fiber.

Another aspect of the invention is a seismic sensor system. A system according to this aspect of the invention includes at least two accelerometers. Each accelerometer comprises at least one optical fiber and a means for changing the length of the at least one optical fiber in response to acceleration. Means for sensing the change in length of the optical fiber in each of the accelerometers is functionally coupled to each fiber. The means for changing length and the optical fiber of each accelerometer are enclosed in a pressure compensated housing. The housing is filled with a substantially incompressible fluid. In one embodiment, the means for changing length includes a beam. The at least one optical fiber in each accelerometer is affixed to one side of the beam such that deflection of the beam changes the length of the optical fiber. The at least two accelerometers are oriented so as to be sensitive to acceleration at least in part along mutually orthogonal directions.

Another aspect of the invention is a gravity orientation system. A system according to this aspect of the invention includes three accelerometers, each accelerometer including a means for changing a length of an optical fiber in response to Earth's gravity. The at least three accelerometers are each oriented to be sensitive to acceleration at least in part along mutually orthogonal directions. The at least one fiber in each accelerometer comprises a Bragg grating thereon, such that an orientation with respect to Earth's gravity of a deflecting axis of each beam is determinable by measurement of a change in wavelength of light reflected by the Bragg grating. By so measuring the change in length of the Bragg grating, an orientation of each accelerometer, and thus the system, with respect to Earth's gravity is determinable. The means for changing length and the optical fiber of each accelerometer are enclosed in a pressure compensated housing. The housing is filled with a substantially incompressible fluid.

Other aspects and advantages of the invention will be apparent from the following description and the appended claims.

DETAILED DESCRIPTION

Generally, accelerometers according to the various aspects of the invention work on the principle of changing the length of an optical fiber in response to acceleration. According to the various aspects of the invention, a means for changing the length of an optical fiber in response to acceleration is functionally coupled to an optical fiber. The means for changing the length of the optical fiber and the optical fiber are enclosed in a pressure compensated housing. The pressure compensated housing is filled with a substantially incompressible fluid.

Figure 1:
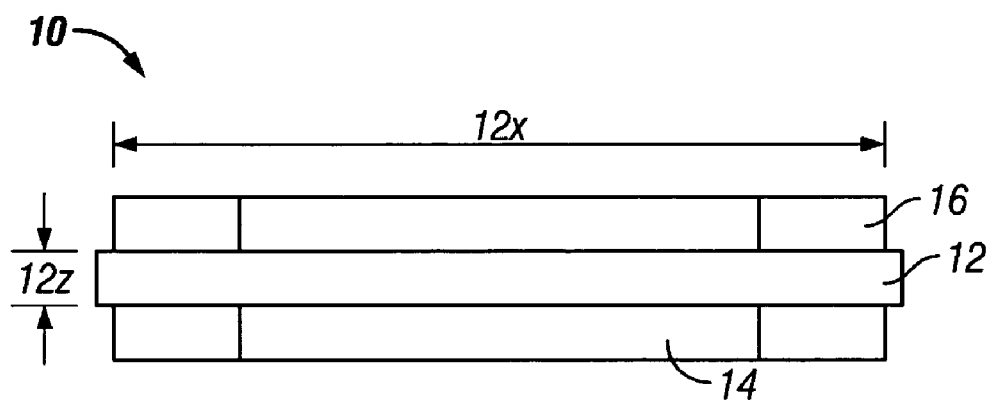
FIG. 1 shows a side view of one embodiment of an accelerometer according to the invention.

Some embodiments of optical accelerometers that can be used in particular embodiments of the invention work on the principle of the deflecting beam, where the beam is typically supported at its longitudinal ends. Supporting the beam at its longitudinal ends substantially prevents beam flexure in any direction transverse to the plane of the beam. FIG. 1 shows one embodiment of an accelerometer beam assembly 10 including a beam 12 which may be made from plastic or other suitable material subject to elastic strain under acceleration. The beam 12 has dimensions shown in FIG. 1 by 12X, which is the length or longitudinal dimension, and 12Z which is the thickness dimension. The plane of the beam 12 is transverse to the thickness dimension 12Z. The dimensions 12X and 12Z should be selected to enable relatively free flexure in the direction of the thickness 12Z, that is, transverse to the plane of the beam 12, while substantially preventing any flexure of the beam along the longitudinal dimension 12X. The embodiment shown in FIG. 1 includes an optical fiber 14 affixed to one face or side of the beam 12. Affixing the fiber 14 to the beam 12 may be performed by adhesive bonding or similar technique.

In the embodiment of FIG. 1, a second optical fiber 16 is shown affixed to the opposite face of the beam 12. As the beam 12 deflects under acceleration along the direction of the thickness 12Z, the optical fibers 14, 16 are stretched or compressed, depending on the direction of deflection of the beam 12. The stretching and compression of the one fiber 14 is in opposed polarity to that of the other fiber 16 because they are disposed on opposite sides of the beam 12. Such arrangements are known as "push-pull" connections of optical fibers.

A signal from the accelerometer related to the acceleration applied thereto is generated by determining a change in length of the optical fiber 14, if only one fiber is used, or of both optical fibers 14, 16 if two such fibers are used. In practical embodiments, measurement of the change in length of the fiber may be performed by an optical interferometer. The optical connections and use of the fibers 14, 16 as part of an optical interferometer to generate an acceleration-responsive signal will be explained below with reference to FIGS. 5 and 5A. It should be understood that only one optical fiber affixed to one face or the other of the beam, such as fiber 14 or 16 is required to make the accelerometer function. The dual-fiber embodiment of FIGS. 1 and 2 is intended to have increased sensitivity as compared to that expected from a single fiber implementation, and to attenuate other noise sources such as created by non-collocated reference arms or compensating interferometers.

Figure 2:
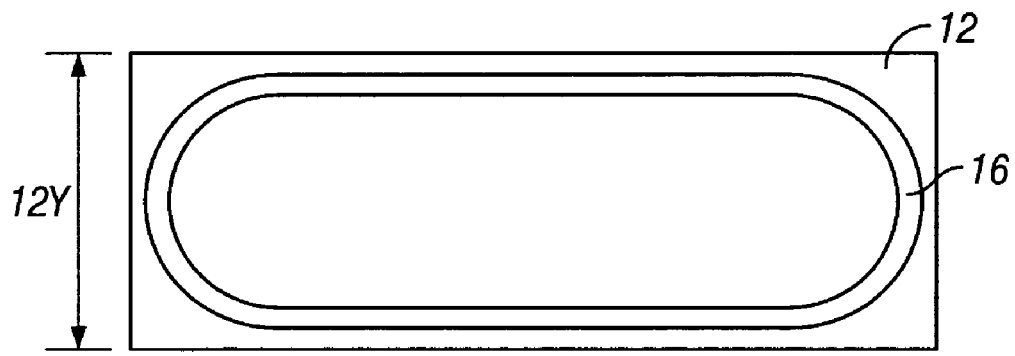
FIG. 2 shows a top view of the accelerometer shown in FIG. 1.

FIG. 2 shows a top view of the accelerometer beam assembly 10. The beam 12 has a width dimension 12Y. As shown in FIG. 2, the optical fiber 16 may be arranged about the face of the beam 12 in a generally oval shape to maximize the amount of fiber disposed along the longitudinal dimension (12X in FIG. 1), while minimizing the degree of bending within the fiber 16 so as to minimize optical losses in the fiber 16. The width dimension 12Y should be selected to make the beam 12 rigid enough along the width direction to resist flexure, but no too large as to induce any appreciable degree of bending or twisting in the beam 12 under oblique acceleration.

Figure 3:
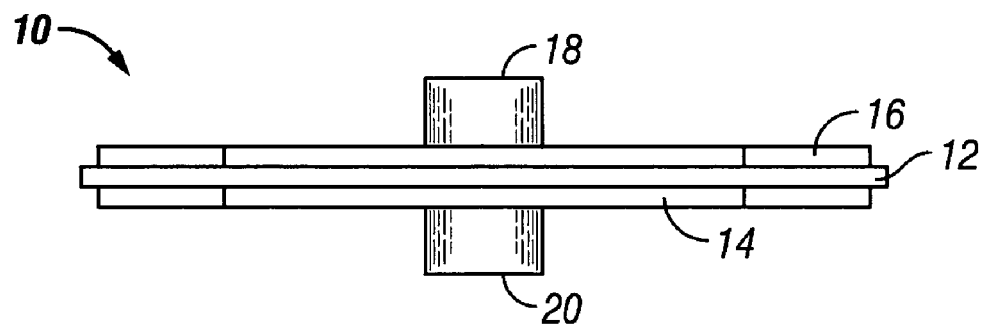
FIG. 3 shows a side view of another embodiment of an accelerometer.

Another embodiment of an accelerometer beam assembly, shown in FIG. 3, can include a reactive mass 18, 20 affixed to one or both faces of the beam 12, generally in the center thereof. The masses 18, 20 increase the amount of deflection of the beam 12 under any given amount of acceleration, and thus, increase the overall sensitivity of the accelerometer.

Figure 4:
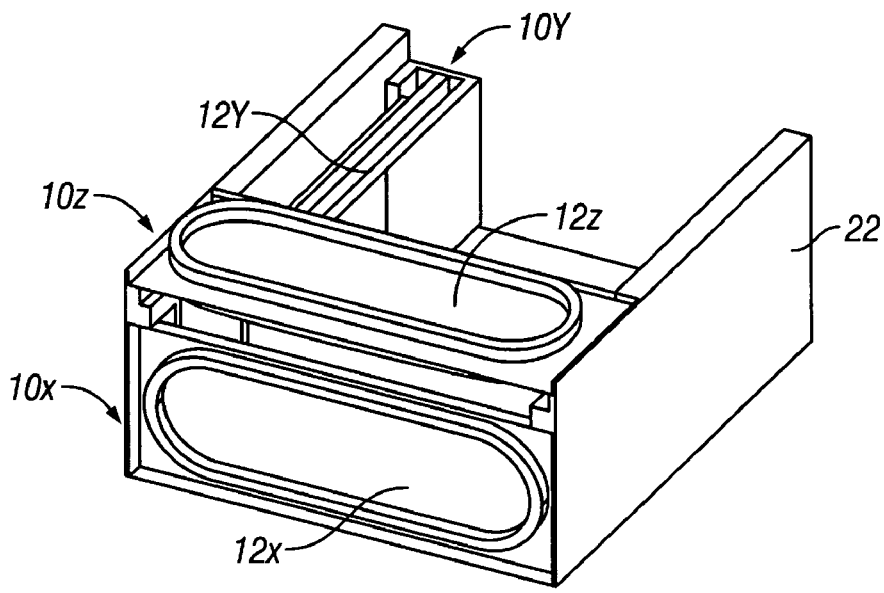
FIG. 4 shows an oblique view of one embodiment a multicomponent seismic sensor system.

A practical multicomponent seismic sensor system may be made from a plurality of accelerometers such as explained with reference to FIGS. 1 through 3. FIG. 4 shows one embodiment of such a multicomponent seismic sensor system. The system includes three optical accelerometers, 10X, 10Y, 10Z, each oriented such that its sensitive direction is along a mutually orthogonal direction from those of the other two accelerometers. Having the accelerometers be mutually orthogonal facilitates determining the direction from which detected seismic energy originates, however, it should be understood that mutual orthogonality of the accelerometers is a matter of convenience in the design of the seismic sensor system. Other arrangements of the sensitive axes of the accelerometers may be used in different embodiments, while maintaining the capability of determining direction of origin of seismic energy.

The accelerometers 10X, 10Y, 10Z may be mounted in a frame 22 for convenient assembly within a pressure compensated housing. Enclosing the frame 22 and accelerometers in such a housing is for when the accelerometers are to be submerged in water. The accelerometers would be subject to submersion in the case when the system is used in a marine seismic survey system or in a permanent sensor installation such as would be used on the sea floor or in a wellbore. The housing will be further explained below with reference to FIG. 13.

Figure 5:
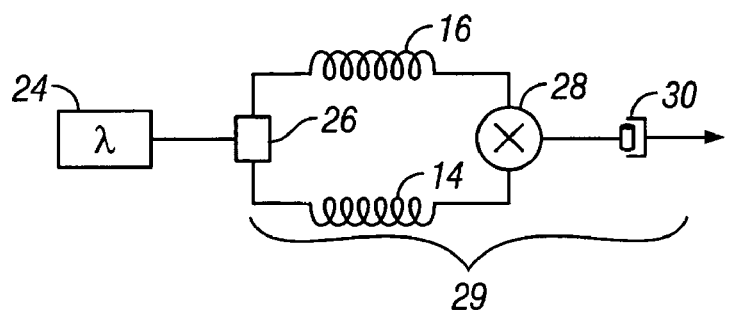
FIG. 5 shows one embodiment of an interferometer used to determine change in length of fibers in various accelerometer embodiments.

One embodiment of an optical interferometer and associated components used to generate an acceleration-responsive signal from beam deflection is shown at 29 in FIG. 5.

The optical fibers 14, 16 attached to opposite sides of the beam (12 in FIG. 1) are each shown optically coupled at one end to a beam splitter 26, and coupled at the other end to a combiner 28. A light source, such as a laser diode 24 is coupled to the input of the beam splitter 26 and provides laser light to each fiber 14, 16. A photodetector 30 is coupled to the output of the interferometer 29, and produces an electrical signal corresponding to the optical signal generated in the interferometer 29. Thus, deflection of the beam (12 in Figure) under acceleration along the thickness direction (12Z in FIG. 1) is converted into an electrical signal. Depending on the particular arrangement of a seismic sensor system, the laser diode 24 and photodetector 30 may be disposed at the Earth's surface or water surface, and the beam splitter 26 and combiner 28 disposed near the accelerometer(s) (12 in FIG. 1). However, other embodiments may locate the laser diode and beam splitter proximate the interferometer, such as in the frame (22 in FIG. 4). The optical interferometer system shown in FIG. 5 is generally known as a Mach-Zehnder interferometer.

Figure 5A:
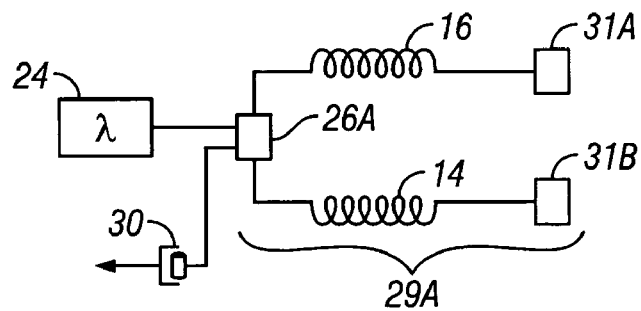
FIG. 5A shows an alternative arrangement of interferometer.

Alternatively, as shown in FIG. 5A, a Michelson interferometer may be used. The Michelson interferometer 29A is made by substituting the combiner (28 in FIG. 5) with mirrors 31A and 31B at the distal ends of each fiber 14, 16. Light passing through the fibers 14, 16 is reflected back by the mirrors 31A, 31B. The back reflected light is recombined in the beam splitter 26A such that phase shift and/or interference pattern may be detected by the photodetector 30.

Other types of interferometers that can be used with various embodiments of accelerometer include Fabry-Perot and Sagnac interferometers. In embodiments which use a Fabry-Perot interferometer, the fiber (either 14 or 16 in FIG. 1) affixed to one or the opposite face of the beam (12 in FIG. 1) may be excluded. The remaining fiber (16 or 14 in FIG. 1) may include a Bragg grating thereon where the fiber is affixed to the beam (12 in FIG. 1) to enable determining a change in length of the fiber by measuring change in wavelength of back-reflected light through the fiber. Accordingly, the particular interferometer system used in various embodiments is not a limitation on the scope of the invention. A particular application for a Bragg grating on one or both fibers 14, 16 will be explained below with reference to FIG. 8.

Figure 6:
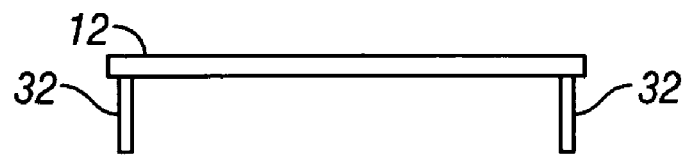
FIG. 6 shows an accelerometer beam supported at both longitudinal ends.

FIG. 6 shows a lateral view of the beam 12 and supports 32 at the longitudinal ends of the beam 12. By supporting the beam 12 at its longitudinal ends, and by suitable dimensions (12X, 12Z in FIG. 1 and 12Y in FIG. 2) flexure of the beam 12 will be substantially limited to the thickness dimension (12Z in FIG. 1). Thus limiting flexure of the beam 12 provides the accelerometer beam assembly (10 in FIG. 1) with a high degree of cross-component rejection or insensitivity. Initial evaluation of the accelerometer as shown in FIG. 1 indicates a cross-component rejection of greater than 30 dB.

Figure 8:
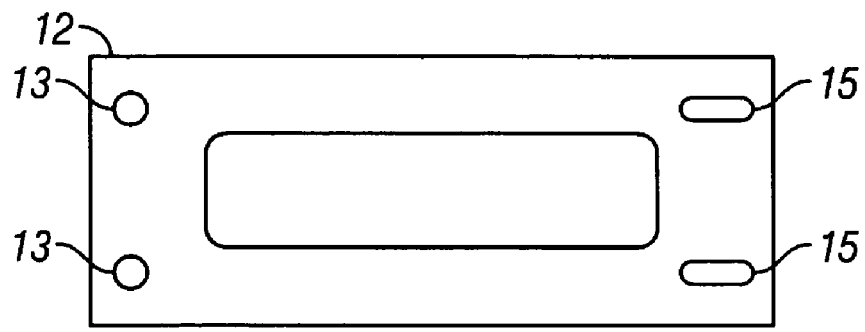
FIG. 8 shows a particular embodiment of an accelerometer beam.

As will be readily appreciated, rigidly, fixedly supporting the beam 12 at both longitudinal ends can provide a high degree of cross component rejection, but may limit the amount of beam deflection (and thus sensitivity) in the thickness direction. Beam deflection would be limited in such cases because the beam would necessarily have to elongate along the longitudinal direction (12X in FIG. 1) if the beam is rigidly, fixedly supported at both ends. To increase the amount of deflection while maintaining high cross component rejection, an arrangement such as shown in FIG. 8 may be used to support the beam 12 at its longitudinal ends. Mounting holes 13 at one end may be provided for cap screws or the like. The other end may include elongated openings 15 such that under flexure, when the longitudinal dimension would be reduced by a proportionate amount, the other end of the beam 12 is free to move longitudinally, but substantially not transversely to the longitudinal direction.

Figure 7:
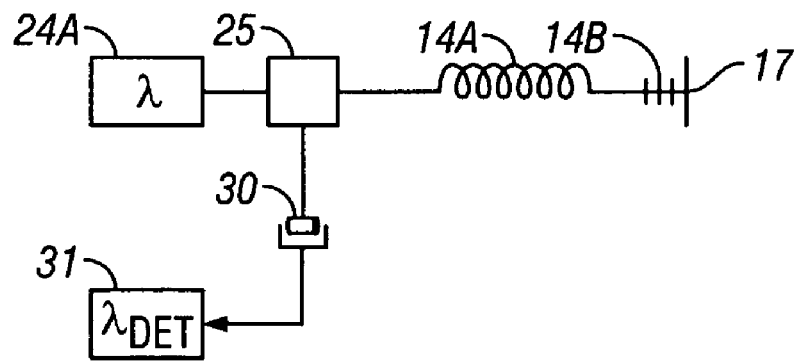
FIG. 7 shows an embodiment of optical detection system used to determine gravity orientation (inclinometer) of an accelerometer.

FIG. 7 shows a particular embodiment, which may be used to determine an orientation of the accelerometer with respect to Earth's gravity as well as make acceleration measurements. A fiber 14A includes a Bragg grating 14B thereon. The fiber 14A can be affixed to a beam substantially as explained with reference to FIG. 1. A light source 24A, such as a laser diode, is optically coupled to one end of the fiber 14A through a beam splitter 25. The fiber 14A may include a mirror 17 at its other end. A photodetector 30 is coupled to the other output of the beam splitter 25. The output of the photodetector 30 may be coupled to a spectral analyzer 31. Thus, the wavelength of light reflected by the Bragg grating 14B is related to the degree of elongation of the Bragg grating 14B. The accelerometer may be used to determine the orientation thereof by calibrating the Bragg grating reflected wavelength both at zero gravity and at unity (100% gravity). Measurements of the reflected light wavelength can be related to orientation of the accelerometer with respect to gravity by well known trigonometric relationships.

In the present embodiment, the accelerometer may be calibrated to zero gravity by orienting the beam (12 in FIG. 1) such that the thickness, or deflecting, dimension of the beam (12Z in FIG. 1) is oriented transversely to Earth's gravity. A wavelength of light reflected by the Bragg grating 14B is measured by the spectral analyzer 31. Then the beam is oriented such that its deflecting direction (12Z in FIG. 1) is directly along Earth's gravity, and the wavelength of the light reflected by the Bragg grating 14B is again measured. The wavelength of the light reflected by the Bragg grating 14B will change as the fiber 14A is lengthened by deflection of the beam, and consequent elongation of the Bragg grating 14B. The relative orientation of the accelerometer with respect to Earth's gravity will thus be related to the light wavelength reflected from the Bragg grating 14B. The optical components described with reference to FIG. 8 may be included as a separate fiber in any particular accelerometer, or, as shown in FIG. 8, may be included in the same fiber used in the accelerometer sensor.

Figure 9:
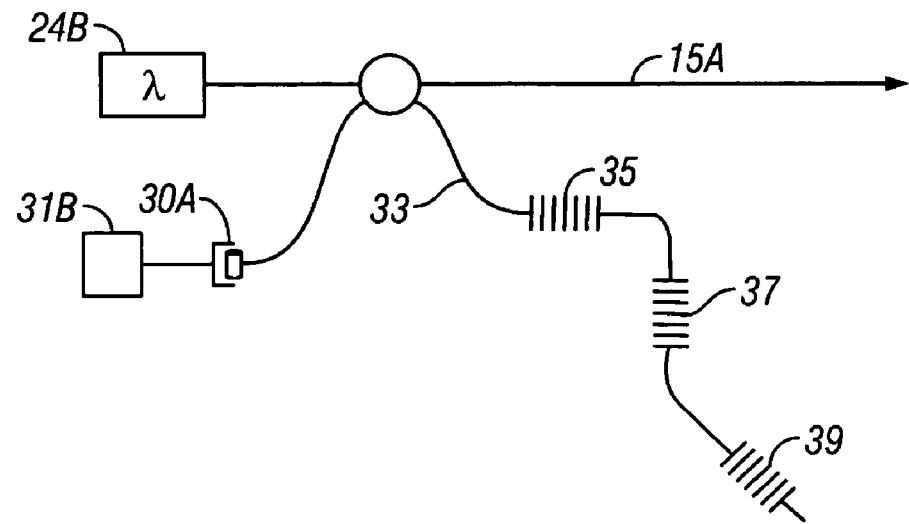
FIG. 9 shows an alternative embodiment of inclinometer.

In a multicomponent sensor system, such as shown in FIG. 4, three mutually orthogonal accelerometers may each include a fiber having a Bragg grating thereon. Associated optical components can be used to enable determining a change in length of the grating, as shown in FIG. 9. In the embodiment of FIG. 9, a single optical fiber 33 may include three separate Bragg gratings 35, 37, 39 thereon. Each Bragg grating 35, 37, 39 is affixed to one of the three accelerometer beams, as will be explained with reference to FIG. 10. Each Bragg grating 35, 37, 39 will be elongated, and thus reflect a particular wavelength of light, based on the orientation of the corresponding accelerometer beam with respect to Earth's gravity. Thus, the orientation of the sensor system may be inferred by measurement of the wavelength of the Bragg grating output of each of the three Bragg gratings 35, 37, 39, and thus the orientation of each accelerometer with respect to gravity. Orientation of the entire sensor system with respect to gravity may be determined from the three individual accelerometer gravity component measurements using well known trigonometric relationships. Some embodiments of the accelerometer beam according to the embodiment of FIG. 9 may include one or more reactive masses coupled thereto, such as shown in FIG. 3.

Figure 10:
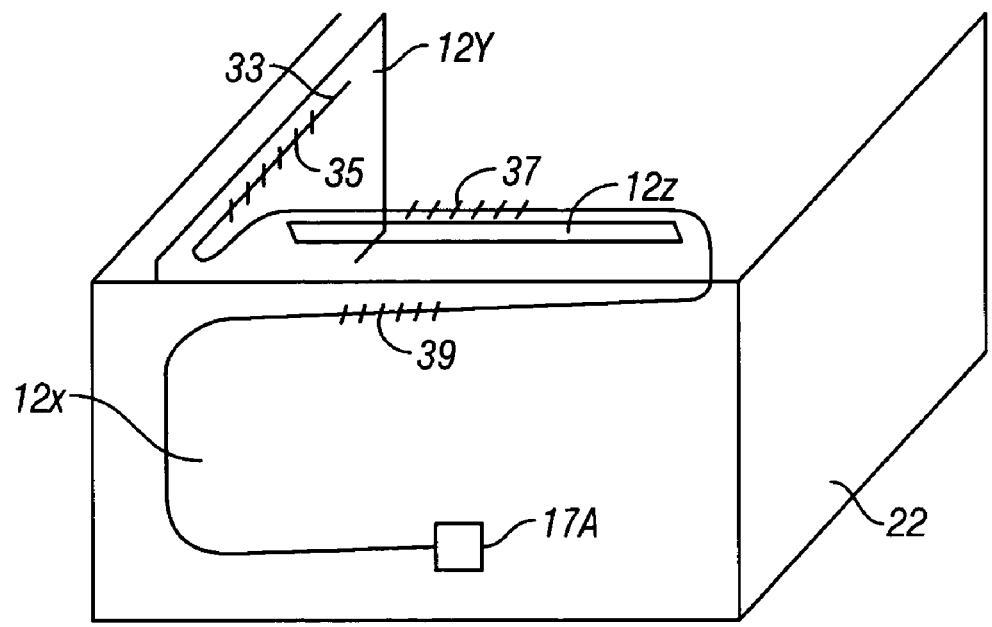
FIG. 10 shows the embodiment of inclinometer shown in FIG. 9 as mounted in a sensor system according to FIG. 4.

FIG. 10 shows the single fiber embodiment of inclinometer of FIG. 9 in which each Bragg grating 35, 37, 39 in the fiber 33 is affixed to a corresponding one of the accelerometer beams 12Y, 12Z, 12X. Each beam 12Y, 12X, 12Z will deflect in relation to the orientation of each beam with respect to Earth's gravity. If a particular beam is transverse to gravity, its deflection from gravity will be substantially zero. Maximum deflection, and corresponding change in the length of the associated Bragg grating, will occur when an accelerometer beam's deflection direction is substantially aligned with Earth's gravity. Orientation can be inferred by well known formulas using measurements of orthogonal components of Earth's gravity. In the embodiment of FIG. 10, the accelerometer beams may be oriented substantially orthogonally. Other embodiments may include a separate fiber for each Bragg grating, or may include a Bragg grating on the same sensing fibers used in one or more types of interferometer for sensing seismic energy, as explained with reference to FIGS. 1-4.

Figure 11:
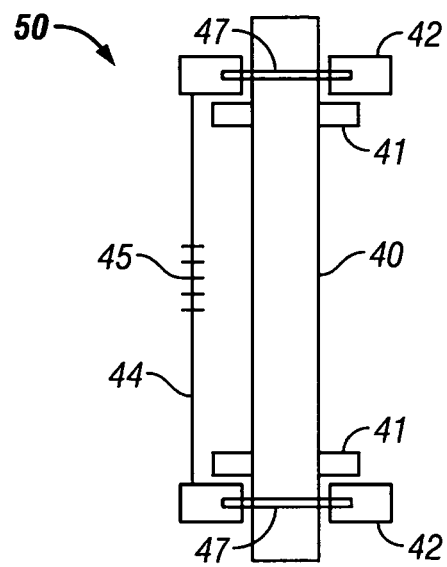
FIG. 11 shows an alternative embodiment of an inclinometer.

Another embodiment of an inclinometer 50, shown in FIG. 11, can provide increased strain in a fiber Bragg grating with respect to Earth's gravitational pull by mass loading the fiber Bragg grating directly. Such direct mass loading can increase the accuracy of the measurement of inclination. As shown in FIG. 11, linear bearings, or some other high precision constraining device, 47 enable masses 42, 43 to slide along a frame or rod 40 as a result of the force created by Earth's gravity. Coupling a fiber 44 having a Bragg grating thereon to the bearings 47, and thus operatively to the masses 42, 43, and adding a positive stop or snubber 41 to each end of the portion of the rod 40 for which mass travel is permitted enables for the Bragg grating 45 to be strained by either one of the masses 43, 42, regardless of orientation of the device with respect to gravity. For example, in the orientation shown in FIG. 11, the upper mass 42 is stopped by the snubber 41, while the lower mass 43 can moved when pulled by gravity so as to strain the fiber 44. If the accelerometer is rotated so that the lower mass 43 is above the upper mass 42, the lower mass 43 will be stopped by the snubber 41, and the upper mass 42 will move when loaded by gravity. Pulling directly on the fiber 44, as shown in FIG. 11, can induce more strain in the Bragg grating 45 creating a greater wavelength shift. Because the masses 42, 43 travel along the rod 40 on linear bearings, the masses 42, 43 are substantially prevented from movement other than along the rod 40. By limiting motion of the masses 42, 43 to along the rod, 40, the inclinometer 50 is substantially sensitive only to the component of acceleration (i.e., Earth's gravity) acting along the length of the rod 40, and thus has high cross component rejection. The inclinometer 50 shown in FIG. 11 can be calibrated substantially as explained above with reference to FIG. 9.

Figure 11A:
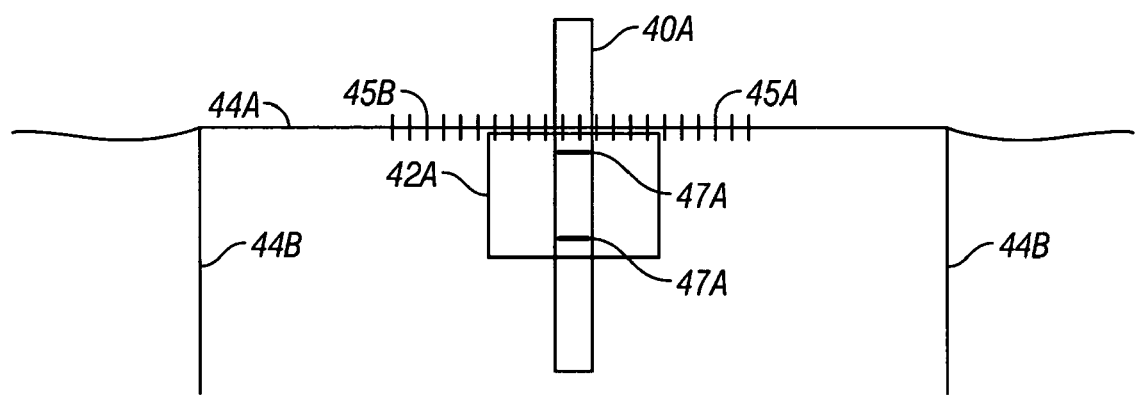
FIG. 11A shows an alternative embodiment of an inclinometer that works on a similar principle to the device shown in FIG. 11.

An alternative arrangement of an inclinometer that works generally on the same principle as the device shown in FIG. 11 is shown schematically in FIG. 11A. A mass 42A is suspended along a rod 40A by linear bearings 47A, such that the mass 42A can move along the direction of the rod 40A, but is substantially restrained from movement in any other direction. An optical fiber 44A having a Bragg grating 45A thereon is coupled to the mass 42A such that the mass 42A is disposed along the fiber 44A between two fiber suspension points 44B. The fiber 44A is also affixed to the suspension points 44B. As gravity acts on the mass 42A, it pulls on the fiber 44A and causes its length to change, which is detectable by change in the light reflection wavelength of the Bragg grating 45A. In principle of operation and calibration, the device shown in FIG. 11A operates substantially similarly to the device shown in FIG. 11. The embodiment shown in FIG. 11A has the advantage of being operable in any orientation with respect to gravity using only a single mass and requiring no snubbers as does the device shown in FIG. 11.

Figure 12:
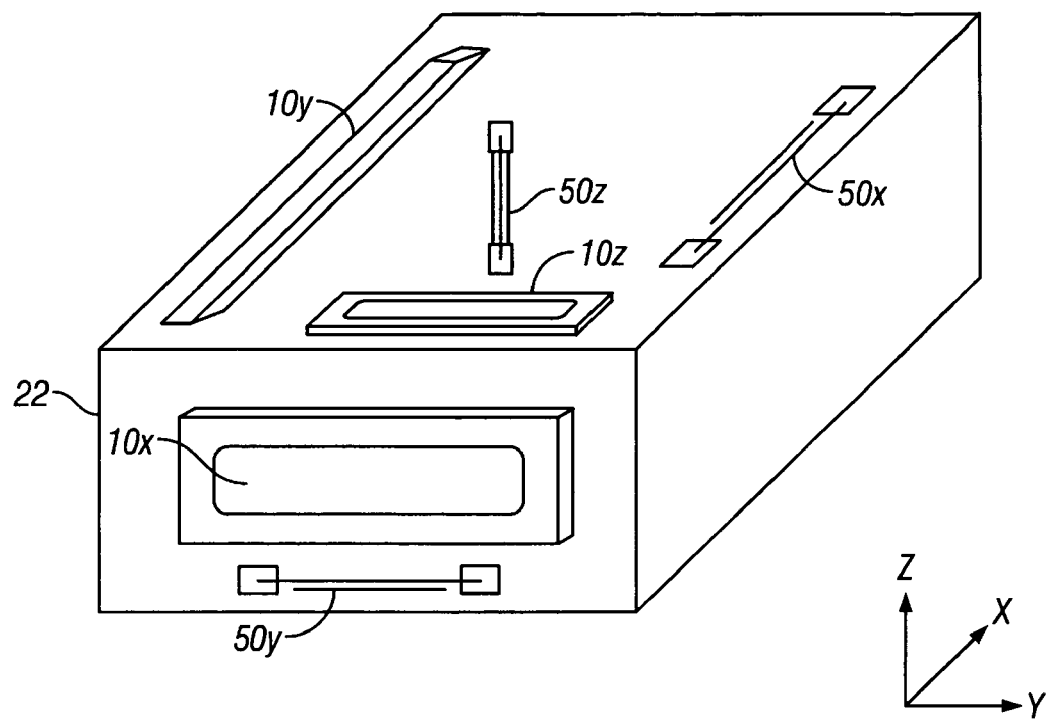
FIG. 12 shows an example multicomponent seismic sensor system including inclinometers as shown in FIG. 11.

FIG. 12 shows an embodiment of a multicomponent seismic sensor system including three, mutually orthogonal inclinometers 50X, 50Y, 50Z, and three mutually orthogonal accelerometers 10X, 10Y, 10Z. The system in FIG. 12 is similar in operating principle to that shown in FIG. 10, however the inclinometers 50X, 50Y, 50Z are of the kind explained with reference to FIG. 11. The references X, Y and Z relate to the individual sensitive axes of the sensor system, which by convention may be labeled such that ordinarily horizontally disposed axes are X and Y, and the vertically disposed axis is Z. The system may be disposed in a frame 22 as are other embodiments, such as explained with reference to FIG. 4 and FIG. 10.

Figure 13:
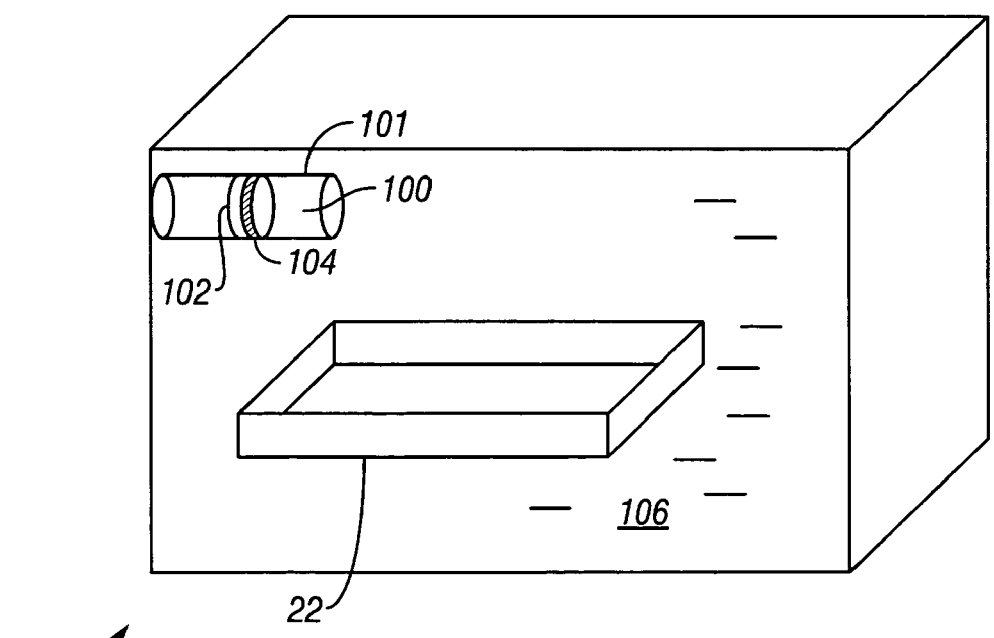
FIG. 13 shows one embodiment of a pressure compensated housing.

Any of the embodiments of optical accelerometer and inclinometer, as well as other types of optical accelerometer, may be enclosed in a pressure compensated housing as will be explained with reference to FIG. 13. The housing 122 may be a plastic, rubber or relatively thin-walled metal, enclosure that is adapted to be filled with a substantially incompressible material 106 such as oil, or other fluid, or gel. For purposes of defining the scope of the invention materials known as "gels", such as may be formed from hydrocarbon based oil mixed with cross-linking polymers. Materials of such type, and other materials known as "gels" are known in the art for filling seismic streamers. The frame 22, such as may include one or more optical accelerometers or inclinometers, including those described above with reference to FIGS. 1-12, may be fixedly mounted within the interior of the housing 122. The housing 122 includes a pressure compensator 100 operable to cause fluid pressure inside the housing 122 to substantially match ambient pressure outside the housing 122. In the embodiment shown in FIG. 13, the pressure compensator 100 can include a piston 102 movably disposed within a cylinder 101 disposed inside the housing 122, such that one side of the piston 102 is in fluid communication with the outside of the housing 122, and the other side of the piston 102 is in fluid communication with the inside of the housing 122. The piston 102 may be sealed against the interior of the cylinder 101 by an o-ring 104 or similar sealing element to reduce fluid leakage past the piston 102. As pressure outside the housing 122 increases, the piston 102 is caused to move inwardly, correspondingly compressing the fluid 106 inside the housing 122. Corresponding opposite movement of the piston 102 takes place when the external pressure decreases. The pressure compensator 100 thus serves the purpose of readily communicating pressure changes outside the housing 122 to the interior of the housing 122 so as to equalize the pressures thereof, while substantially retaining the fill material 106 within the housing 122. Other embodiments of pressure compensator may include elastomer bladders or the like. By maintaining fluid pressure inside the housing 122 substantially equal to fluid pressure outside the housing 122, it is possible to build the housing 122 without the need to make it strong enough to resist crushing under high external pressure, as is required with conventional, pressure resistant, sealed housings having atmospheric pressure (about 1 bar) in the interior thereof.

It is preferable in embodiments such as explained with reference to FIG. 13 for the optical accelerometer components, such as the beam and fiber, and any interferometer components to be disposed in the housing 122 to be encapsulated with epoxy or similar encapsulating compound to prevent fluid entry into such components.

Optical accelerometers and sensing systems made therewith disposed in a pressure compensated housing can provide the improved performance of optical accelerometers for detecting such acceleration as seismic energy, while enabling the sensors to be deployed in deep ocean water using relatively light, inexpensive housings.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A pressure compensated optical accelerometer, comprising:
   at least one optical fiber affixed to a beam, the beam arranged to deflect in response to acceleration to change a length of a fiber;
   means for sensing the change in length of the at least one optical fiber;
   a housing, the beam and the at least one optical fiber disposed in the housing, the housing filled with at least one of a substantially incompressible fluid and gel; and
   means for compensating pressure associated with the housing, the means for compensating configured to communicate pressure outside the housing to inside the housing, the compensator configured to substantially prevent fluid flow therethrough.

2. The accelerometer of claim 1 further comprising an additional optical fiber affixed to the other side of the beam such that deflection of the beam changes a length of the additional fiber opposite in polarity to the change in length of the at least one optical fiber affixed to the one side of the beam.

3. The accelerometer of claim 1 further comprising a mass affixed to the beam such that a magnitude of the deflection of the beam is increased with respect to a magnitude of an acceleration applied to the beam.

4. The accelerometer of claim 1 wherein the means for sensing comprises a Michelson interferometer.

5. The accelerometer of claim 1 wherein the means for sensing comprises a Fabry-Perot interferometer.

6. The accelerometer of claim 1 wherein the means for sensing comprises a Mach-Zehnder interferometer.

7. The accelerometer of claim 1 further comprising a light wavelength sensor optically coupled to the at least one fiber, and wherein the at least one fiber comprises a Bragg grating thereon, such that an orientation with respect to Earth's gravity of a deflecting axis of the beam is determinable by measurement of a change in wavelength of light reflected by the Bragg grating.

8. The accelerometer of claim 1 further comprising a second optical fiber affixed to the beam such that deflection of the beam changes a length of the second fiber, the second fiber having a Bragg grating thereon, the second fiber optically coupled to a wavelength detector such that an orientation of the accelerometer with respect to Earth's gravity is determinable by measurement of a change in wavelength of light reflected by the Bragg grating.

9. The accelerometer of claim 1 wherein the beam is supported on at least one longitudinal end thereof.

10. The accelerometer of claim 1 wherein the beam is supported at both longitudinal ends thereof, at least one longitudinal end being supported so as to enable longitudinal movement when the beam is deflected.

11. The accelerometer of claim 2 wherein the housing comprises a piston in hydraulic communication on one side with an interior of the housing and on its other side with an exterior of the housing so as to provide the pressure compensation to the housing.

12. A multicomponent seismic sensor system, comprising:
    at least two accelerometers, each accelerometer comprising at least one optical fiber affixed to a beam, the beam arranged to deflect in response to acceleration to change a length of the fiber, the at least two accelerometers oriented to be sensitive to acceleration at least in part along mutually orthogonal directions;
    means for sensing the change in length of the optical fiber in each of the accelerometers;
    a housing, each accelerometer disposed in the housing, the housing filled with at least one of a substantially incompressible fluid and gel; and
    means for compensating pressure associated with the housing, the means for compensating configured to communicate pressure outside the housing to inside the housing, the compensator configured to substantially prevent fluid flow therethrough.

13. The system of claim 12 wherein each accelerometer further comprises:
    an additional optical fiber affixed to the other side of the beam such that deflection of the beam changes a length of the additional fiber opposite in polarity to the change in length of the at least one optical fiber affixed to the one side of the beam.

14. The system of claim 12 further comprising a mass affixed to each beam such that a magnitude of the deflection of each beam is increased with respect to a magnitude of an acceleration applied to each beam.

15. The system of claim 12 wherein the means for sensing comprises a Michelson interferometers.

16. The system of claim 12 wherein the means for sensing comprises a Fabry-Perot interferometers.

17. The system of claim 12 wherein the means for sensing comprises a Mach-Zehnder interferometers.

18. The system of claim 12 further comprising a light wavelength sensor optically coupled to the at least one fiber in each accelerometer, and wherein the at least one fiber in each accelerometer comprises a Bragg grating thereon, such that an orientation with respect to Earth's gravity of a deflecting axis of each beam is determinable by measurement of a change in wavelength of light reflected by each Bragg grating.

19. The system of claim 12 further comprising:
    three accelerometers, each accelerometer comprising a beam and at least one optical fiber affixed to one side of the beam such that deflection of the beam changes a length of the optical fiber, the at least three accelerometers oriented to be sensitive to acceleration at least in part along mutually orthogonal directions;
    means for sensing the change in length of the optical fiber in each of the accelerometers; and
    wherein the at least one fiber in each accelerometer comprises a Bragg grating thereon, such that an orientation with respect to Earth's gravity of a deflecting axis of each beam is determinable by measurement of a change in wavelength of light reflected by the Bragg grating, such that an orientation of the system with respect to Earth's gravity is determinable.

20. The system of claim 19 wherein the optical fiber in each accelerometer is the same fiber, the same fiber having a Bragg grating thereon where the same fiber is affixed to each beam, each Bragg grating reflecting a selected wavelength of light.

21. The system of claim 12 wherein each beam is supported at both longitudinal ends thereof, at least one longitudinal end being supported so as to enable longitudinal movement when each beam is deflected.

22. The system of claim 12 wherein the housing comprises a piston in hydraulic communication on one side with an interior of the housing and on its other side with an exterior of the housing so as to provide the pressure compensation to the housing.

23. A gravity orientation system, comprising:
three accelerometers, each accelerometer comprising a beam and at least one optical fiber affixed to one side of the beam such that deflection of the beam changes a length of the optical fiber, the three accelerometers oriented to be sensitive to acceleration at least in part along mutually orthogonal directions;
a Bragg grating on the at least one optical fiber in each accelerometer;
means for measuring a wavelength of light reflected by each Bragg grating, such that an orientation with respect to Earth's gravity of a deflecting axis of each beam is determinable by measurement of a change in wavelength of light reflected by the Bragg grating, such that an orientation of the system with respect to Earth's gravity is determinable;
a housing, the three accelerometers disposed in the housing, the housing filled with a substantially incompressible fluid; and
means for compensating pressure associated with the housing, the means for compensating configured to communicate pressure outside the housing to inside the housing, the compensator configured to substantially prevent fluid flow therethrough.

24. The system of claim 23 wherein three accelerometers are mutually orthogonal.

25. The system of claim 23 wherein each accelerometer beam comprises a reactive mass thereon.

26. The system of claim 23 wherein each beam is supported at both longitudinal ends thereof, at least one longitudinal end being supported so as to enable longitudinal movement when each beam is deflected.

27. The system of claim 23 wherein the housing comprises a piston in hydraulic communication on one side with an interior of the housing and on its other side with an exterior of the housing so as to provide the pressure compensation to the housing.

28. A gravity orientation sensor, comprising:
at least one optical fiber having a Bragg grating thereon, the fiber operatively coupled to a mass, the mass mounted in a frame such that orientation of the frame with respect to Earth's gravity enables Earth's gravity to act correspondingly on the mass, the operative coupling of the fiber to the mass arranged such that a change in wavelength of reflected from the grating in the fiber corresponds to the action of Earth's gravity on the mass;
means for measuring a change in wavelength or period of the Bragg grating;
a housing, the at least one fiber, the mass and the frame disposed in the housing, the housing filled with a substantially incompressible fluid; and
means for compensating pressure associated with the housing, the means for compensating configured to communicate pressure outside the housing to inside the housing, the compensator configured to substantially prevent fluid flow therethrough.

29. The sensor of claim 28 wherein the mass is suspended on the frame by linear bearings.

30. The sensor of claim 28 further comprising a snubber disposed on the frame such that action of Earth's gravity will result in corresponding change in length of the Bragg grating irrespective of orientation of the frame with respect to gravity.

31. The sensor of claim 28 further comprising:
three frames oriented substantially orthogonally;
three masses each operatively coupled to a respective one of the frames such that Earth's gravity acts on each mass in relation to orientation of the corresponding frame with respect to gravity, the masses arranged to move substantially linearly along a corresponding frame;
a Bragg grating operatively coupled to each mass; and
means for measuring a change in length of each Bragg grating.

32. The sensor of claim 31 wherein the three Bragg gratings are formed on a single optical fiber.

33. The sensor of claim 28 wherein the housing comprises a piston in hydraulic communication on one side with an interior of the housing and on its other side with an exterior of the housing so as to provide the pressure compensation to the housing.

34. A multicomponent seismic sensor system, comprising:
three accelerometers, each accelerometer comprising a beam and at least one optical fiber affixed to one side of the beam such that deflection of the beam changes a length of the optical fiber, the three accelerometers oriented to be sensitive to acceleration at least in part along mutually orthogonal directions;
means for sensing the change in length of the optical fiber in each of the accelerometers;
three frames each having a direction substantially aligned with a sensitive direction one of the accelerometers;
three masses each operatively coupled to a respective one of the frames such that Earth's gravity acts on each mass in relation to orientation of the corresponding frame with respect to gravity, the masses arranged to move substantially linearly along a corresponding frame;
a Bragg grating operatively coupled to each mass;
means for measuring a change in length of each Bragg grating;
a housing, the three accelerometers, the three frames and the three masses disposed in the housing, the housing filled with a substantially incompressible, acoustically transparent material; and
means for compensating pressure associated with the housing, the means for compensating configured to communicate pressure outside the housing to inside the housing, the compensator configured to substantially prevent fluid flow therethrough.

35. The system of claim 34 wherein the housing comprises a piston in hydraulic communication on one side with an interior of the housing and on its other side with an exterior of the housing so as to provide the pressure compensation to the housing.

* * * * *